W. L. W. & J. W. Chapman,
Edge-Tool Grinder.
Nº 5,902.    Patented Nov. 7, 1848.
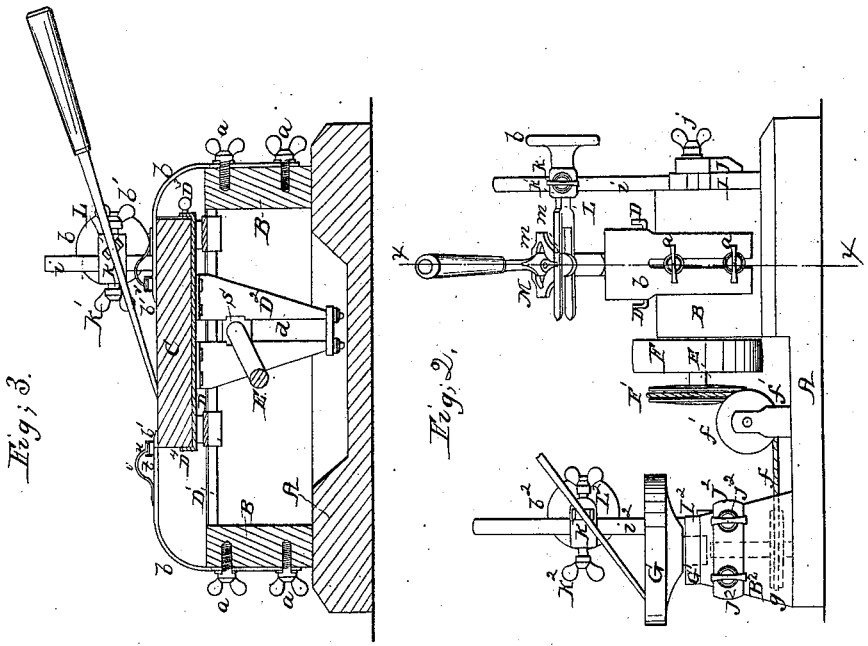
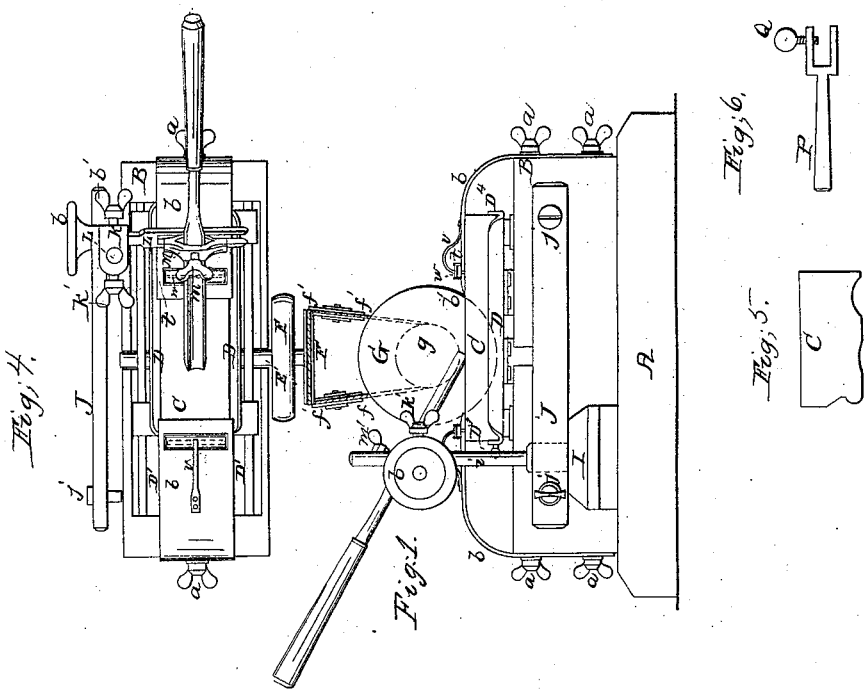

UNITED STATES PATENT OFFICE.

W. Z. W. CHAPMAN AND J. W. CHAPMAN, OF PHILADELPHIA, PENNSYLVANIA.

UNIVERSAL INSTRUMENT-SHARPENER.

Specification of Letters Patent No. 5,902, dated November 7, 1848.

*To all whom it may concern:*

Be it known that we, WILLIAM Z. W. CHAPMAN and JOHN W. CHAPMAN, of the city and county of Philadelphia and State of Pennsylvania, have invented certain new and useful Improvements in Machinery for Grinding and Sharpening Instruments and for other purposes, of which the following is a full, clear, and exact description, reference being had to the annexed drawings of the same, making part of this specification, of which—

Figure 1 is a side elevation, Fig. 2 is an end elevation, Fig. 3 is a vertical longitudinal section through the line $x\ x$ of Fig. 2, Fig. 4 is a top view showing the reciprocating stone with its appendages, Fig. 5 is a transverse section through the reciprocating stone, Fig. 6 represents a forked holder.

The same letters in the different figures refer to corresponding parts.

The nature of our invention and improvement consists of a new combination and arrangement of known mechanical devices, whereby a rectangular grinding block having a plane, or fluted surface, is caused to move backward and forward, under an adjustive turning holder, in which the various articles to be ground are held upon the face of the said block, with ease and accuracy—also in securing over the ends of the grindstone adjustable bent metallic guards, to keep the articles being ground from slipping over the ends of the stone, and prevent the oil, or water, from flying off by its momentum at the time the motion of the stone is changed, and likewise to keep the oil or water supplied in sufficient quantity and evenly spread over the surface of the stone, by means of the sponge, or other absorptive substance secured upon their inner ends—and in combining with the reciprocating stone a flat revolving stone which has likewise a turning adjustive rest connected with it.

To enable others skilled in the art to make and use our invention, we will proceed to describe its construction and operation.

A is the base, or platform upon which the whole machine is arranged, B is the frame upon which the reciprocating grindstone C, with its carriage D is mounted, on suitable ways, or slides D′; near the middle of the frame the crank shaft E is placed on suitable bearings; the crank is connected by means of a slide $s$ Fig. 3, with the slot $d$ of the arm D², which projects from the lower side of the carriage and as the crank revolves slide $s$ plays up and down in the slot $d$, at the same time moving the carriage and stone backward and forward. On the crank shaft E are mounted the main driving pulley F, which receives motion from any convenient, or available prime mover, and the band wheel F′, which, by means of the band $f$ passing under the guide pulleys $f'\ f'$ and around the pulley $g$ turns the vertical shaft G′ and the revolving horizontal, grinding, and polishing disk G which is secured to its upper end in any suitable manner; this disk, with its shaft, is supported by the frame B². On each end of the frame B the bent metallic guards $b\ b$ are secured, by the screws $a\ a$ which pass through the slot, or opening made through their lower ends the guards slide up, or down on these screws for the purpose of adjusting them to the varying thickness of the grinding block, when placed in different positions. Upon the inner ends of each of the guards $b\ b$ a piece of sponge $b'\ b'$, or other absorptive substance is affixed for the purpose of imbibing water, or oil, with which it is from time to time supplied, which oil, or water is gradually given out to supply the grinding surface with a sufficient amount of moisture, as the same plays backward and forward under the said guards. The sponge may be placed in a box $t$ having a perforated bottom and covered by a follower $u$ which is pressed down by a spring $v$ as represented in Figs. 1, 3, 4. The reciprocating and rotary grinding blocks $c$ are made of either natural, or artificial stone, or other suitable substance; when the grinding surfaces of these stones, in consequence of irregular wear, have lost their symmetry of form, they are rendered again symmetrical by removing the guards and grinding them down by the alternate application of two surfaces, plain, or ridged, as the case may require; but which are precisely the counterpart of the form it is desired to give to the grinding surface;—this operation is very simple and is easily done requiring neither much skill nor time in its performance.

On the sides of the frames B and B² the adjustive sliding rests I, I², are placed, they are held in the required position and clamped by the bars J J² which are secured to the sides of the frames by the screws j, j²; when it is required to change the position of the rest by moving it backward, or forward on the side of the frame the screws j j² are loosened and when the rest is adjusted in the required position are again tightened to hold it. Upon the rest I the standard i is erected on which the adjustive head k slides up or down; this head is held in any position in which it may be adjusted by the clamp screw k'. In this head a horizontal turning rest L is secured, by passing the shank, which is cylindrical, through a corresponding hole, or bearing where it is held by the knob l which is secured upon the end of the shank by a pin, nut, or otherwise; this knob performs the office of holding the turning rest in the head and likewise serves as a handle to take hold of to press the instrument upon the stone, by turning it downward when placed between the forked ends of the holder. The holder is sometimes turned into a given position so as to hold the instrument being ground at a fixed angle upon the face of the stone, and is secured in such position by the clamp screw l' Fig. 4, the clamp screw k' in this case being loosened and the force required to press the instrument upon the stone applied to the head k in a downward direction. For the purpose of grinding circular cutting edges in a regular and uniform manner, one, or more of the sides of the reciprocating stone may be made of the required form to effect the object. If a joiner's gage chisel, for instance, is required to be ground, it is placed between the forks of the holder L and then pressed upon the circular ridge, or groove as it is required to be ground on the concave, or convex side. The several sides of the stone are, or may be, very readily placed uppermost, as required, the stone being held upon its carriage, or bed D by a clamp screw D³ acting against one end of it; the other end abutting against a stop D⁴; or it may be secured in any other way which admits of its being easily moved. This method of grinding curved edges would require as many ridges and grooves as there are different curves to be ground, which renders the method inadmissible in practice. For the purpose of getting over this difficulty, and enabling us to grind circular edges at an uniform angle throughout their entire curvature upon a plain surface, by a general method applicable to such cases, we have contrived the vibrating clamp M, which turns on the joint pin m, which pin secures it between the forks of the turning holder; the gouge required to be ground, by this method is placed in the clamp with its convex side downward, and is held there by the clamp screw m' as seen in Figs. 1 and 4, the turning rest L is in all other respects adjusted and operated as if the vibrating clamp were not used; the vibrating clamp may be made of various forms to adapt it to holding different kinds of tools. The operator with his right hand lays hold of the knob l and turns it to give the required degree of pressure of the chisel being ground upon the stone; at the same time with his left hand he turns the vibrating clamp from side to side and with it the chisel, or gouge, through an arc of a circle corresponding to the arc of the curvature of said gouge, or other instrument having a curved edge, which it may be required to grind. Of all the multiform cutting edges of cutlery there is scarcely one to be found among those commonly sharpened by grinding that may not be very readily ground either on the rotary, or the reciprocating stone, for in both cases the face of the stone may be made of any shape that may be necessary to make it conform to the shape of the cutting edge; and thus in the extent of its application it is superior to all other grinding apparatus before known.

Another distinguishing characteristic of our invention is that the nicest and most difficult grinding may be done without necessarily soiling, or in any way bringing the hands into contact with the oil or water, which in the case of dentists, engravers, watchmakers and other artists, or workers in delicate, or highly polished cutlery, is a quality of no little importance.

An apprentice boy can very readily be instructed how to adjust the holder, head, and instrument, in the proper position relative to the stone and to each other, and he is then qualified to grind instruments with a degree of accuracy equal to that of the most experienced workman, and with a degree of accuracy far beyond what the most skilful workman can accomplish by the ordinary methods; indeed so difficult a matter is it to grind delicate cutting instruments in a proper manner by the ordinary modes, and requiring such a degree of nicety and accuracy of manipulation; that but few even of the most skilful workmen who do not make grinding their sole occupation, can ever hope to attain proficiency. We have stated these facts for the purpose of showing that our invention, simple though it be, is nevertheless of great importance in the mechanic arts.

Various kinds of holders may be used adapted to the various kinds of tools to be ground—for instance, a forked holder with a clamp screw to clamp an axe or hatchet between the prongs may be used—the holder having a shank which is to be put between the arms of the rest L—the screw m being inserted through corresponding holes in the rest and shank so as to allow it to have a universal movement. In Fig. 6 is seen one of these forked holders in which P represents the shank to be inserted between the arms of the rest L—and Q the clamp screw for securing an axle, or other article to be ground between the prongs of said holder.

The adjustive sliding rest I$^2$— standard $i^2$ clamp bar J$^2$— clamp screws $j$— adjustive head K$^2$— turning rest L$^2$— knob $b^2$ for holding and directing the instrument to be ground on the rotary disk G, are made and arranged, and used in the same way as these parts are made, arranged and used when grinding with the reciprocating grinder C, before described.

What we claim as our invention and desire to secure by Letters Patent, is—

1. The combination and arrangement of the adjustive turning holder L, with the grindstone C, as herein described, by means of which the apparatus is adapted to the accurate grinding of all manner of edged instruments.

2. We also claim, the combination of the vibrating clamp M and turning holder L, with the adjustive sliding head $k$ in the manner and for the purpose described.

3. We likewise claim, the combination of the grinding block C, with the guards $b$ $b$ having sponges $b'$ $b'$ to be saturated with water, or oil, secured to their inner ends substantially in the manner and for the purpose herein set forth.

In testimony whereof we have hereunto respectively signed our names, before two subscribing witnesses this twenty-fourth day of November A. D. 1847.

W. Z. W. CHAPMAN.
J. W. CHAPMAN.

Witnesses:
W<small>M</small>. P. E<small>LLIOT</small>,
P. H. W<small>ATSON</small>.